Figure 1:
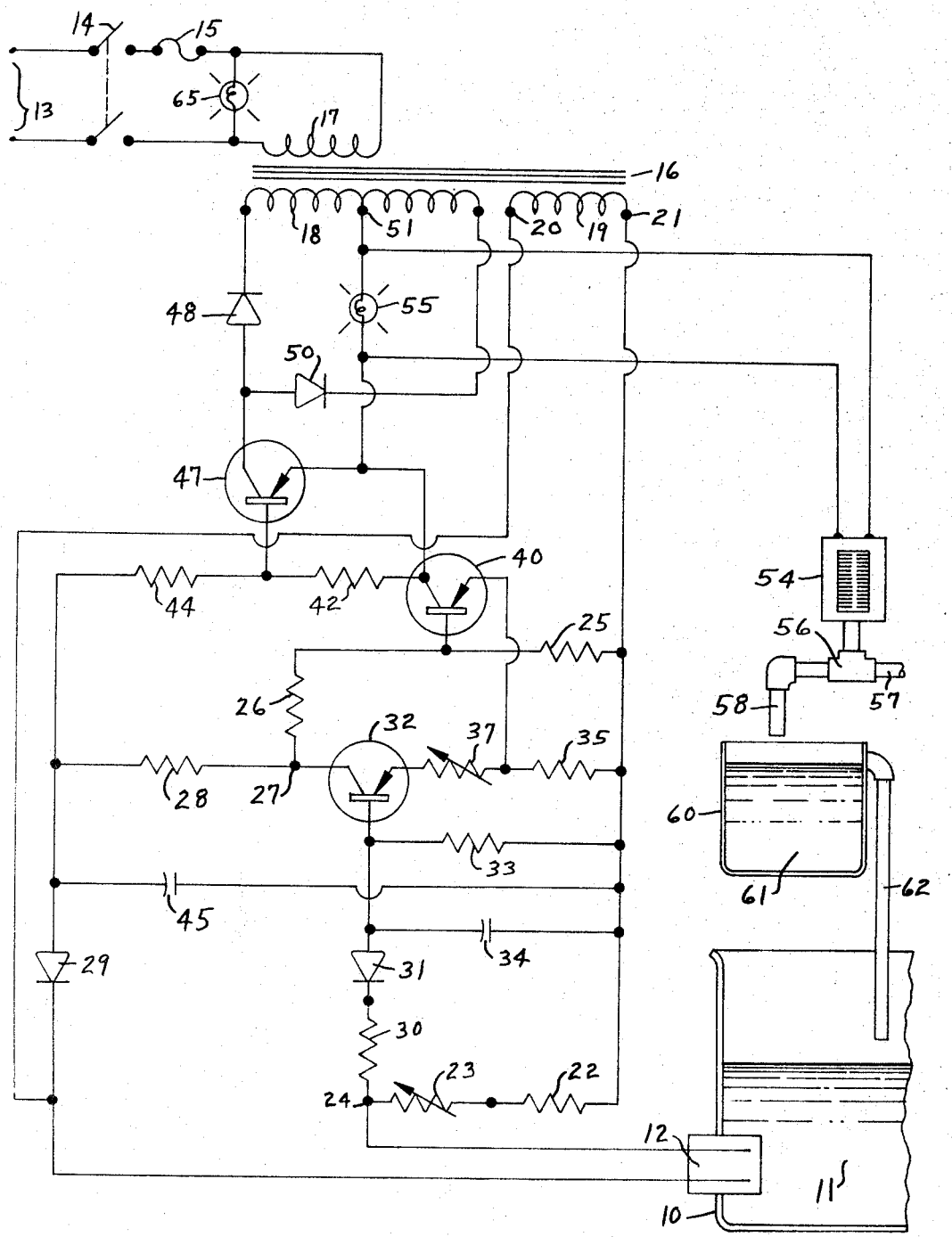

Sept. 19, 1967     K. J. LAW ET AL     3,343,045

SOLUTION CONDUCTIVITY MEASURING AND CONTROLLING APPARATUS

Filed April 1, 1964     2 Sheets-Sheet 1

INVENTORS.
KENNETH J. LAW
GORDON R. BROWN
BY
Donnelly, Mentag & Herrington
ATTORNEYS

INVENTORS.
KENNETH J. LAW
GORDON R. BROWN

ATTORNEYS

United States Patent Office 3,343,045
Patented Sept. 19, 1967

3,343,045
SOLUTION CONDUCTIVITY MEASURING AND CONTROLLING APPARATUS
Kenneth J. Law, Southfield, and Gordon R. Brown, Livonia, Mich., assignors to K. J. Law Engineers, Inc., Detroit, Mich., a corporation of Michigan
Filed Apr. 1, 1964, Ser. No. 356,369
13 Claims. (Cl. 317—148.5)

This invention relates to solution conductivity measuring and controlling apparatus and, more particularly, to such apparatus for automatically controlling the admission of a liquid into a tank to thereby maintain liquid content of such tank at a particular purity or chemical concentration.

It is often necessary in chemical and physical processes to control the ionic concentration or the amount of an ionizing additive in a solution. Numerous attempts have been made to provide suitable apparatus for controlling solution concentration, however, these devices are relatively complex and expensive. Accordingly, it is an object of this invention to provide an improved system for controlling solution concentration.

It is another object of this invention to provide a concentration controlling system employing solid state devices which is compact, efficient and economical.

It is a further object of this invention to provide a reliable system which accurately determines the need for addition of an ionizing agent to a solution to raise the conductivity and thus the ion concentration to a predetermined value.

It is yet another object of this invention to provide an electrical system which includes a predetermined condition responsive impedance connected in a bridge type network with a semi-conductor circuit connected to three terminals of the network and connected to a condition control means which corrects the predetermined condition.

Still another object of this invention is to provide a system which quickly and accurately corrects the conductivity of a fluid to maintain the solution concentration.

It is still a further object of this invention to provide a solution concentration controlling system which can be accurately set to maintain the concentration above a predetermined limit.

It is still another object of this invention to provide a low voltage solid state switching system for accurately controlling a solution concentration which low voltage system includes valve control means operated from the low voltage system for controlling the addition of a concentrate to the solution.

A still further object of this invention is to provide a simple concentration controlling system which can be formed in a printed circuit assembly such as can be removably plugged in and rapidly and easily exchanged with another plug-in assembly if replacement or maintenance is required.

It is another object of this invention to employ, in a solution concentration controlling system, an alternating current measurement in a non-polarizing system.

It is an object of this invention to provide a Wheatstone bridge type sensing circuit with two of the legs conducting alternating current and two of the other legs conducting direct current and a semi-conductor device connected across the diagonal terminals of the bridge and to one of the bridge input terminals to sense the changes in potential across an impedance means in one leg of the bridge.

It is another object of this invention to provide a Wheatstone bridge type circuit with one leg defining a first impedance means, a second leg defining a condition responsive impedance means, these two legs being connected in series between a pair of alternating current input terminals, a third leg defining resistance means having one end connected to one of said alternating current input terminals and a fourth leg including resistance means and unilateral impedance means connected to said third leg and to said second input terminal.

It is a still further object of this invention to provide an alternating current Wheatstone bridge type sensing circuit with a semi-conductor including at least three electrodes, means coupling one of said electrodes to one terminal of said bridge, unilateral impedance means connecting another electrode to another terminal of said bridge and means connecting the third electrode to a third terminal of said bridge.

Briefly, in accordance with aspects of this invention, we have discovered a novel condition responsive system of the Wheatstone bridge type in which the Wheatstone bridge includes a pair of alternating current input terminals and a pair of diagonal terminals, one of the legs of said bridge including a condition responsive variable impedance means, another of the legs of the bridge including rectifier means, a sensing circuit connected between the diagonal terminals and including a semi-conductor device having at least three electrodes, one of the electrodes being connected to one of said diagonal terminals, rectifier means connecting another of the electrodes to another of said diagonal terminals and means connecting the third electrode to one of the alternating current input terminals.

In accordance with more specific aspects of this invention, we employ, in a condition responsive system, a Wheatstone bridge, means for applying an alternating current to opposite input terminals of the bridge, one of the legs of the bridge including a first impedance means and means for manually varying the impedance of the first impedance means, another of the legs of the bridge including a condition responsive impedance means serially connected to the first impedance means and these serially connected legs being connected to the alternating current input terminals. Another of the legs of the bridge includes a pair of serially connected resistance means and a fourth leg of the bridge includes a resistance means and a rectifier means serially connected between one of the alternating current input terminals and the pair of resistance means. The bridge includes a sensing circuit containing a semi-conductor device such as a transistor which has an emitter, a base and a collector electrode. The collector electrode is connected to one of the diagonal terminals; rectifier means connects the base electrode to the other of the diagonal terminals and output means are coupled to the emitter electrode. The output means includes variable resistance means for controlling the lower limit of the condition to which the system is to be responsive. The output means further includes a second transistor having its base electrode connected intermediate the pair of resistance means, having its emitter electrode connected to the variable resistance means, and having its collector electrode connected through a pair of resistors to a point intermediate the first-mentioned rectifier means and the resistance means. The system further includes a third transistor including at least three electrodes, one of the electrodes being connected to the last-mentioned collector electrode and another electrode being connected intermediate the pair of resistors.

In accordance with still further aspects of this invention, the last-mentioned transistor is connected in circuit with a source of potential and a condition control means such that the transistor acts as a solid state switch to complete the circuit between the source of potential and the condition control means whereby the switching transistor completes the circuit for the condition control means when the condition responsive impedance means indicates a requirement for a change of the condition being controlled.

These and various other objects and features of the invention will be more clearly understood from a reading of the detailed description of the invention in conjunction with the drawings.

Figure 2:
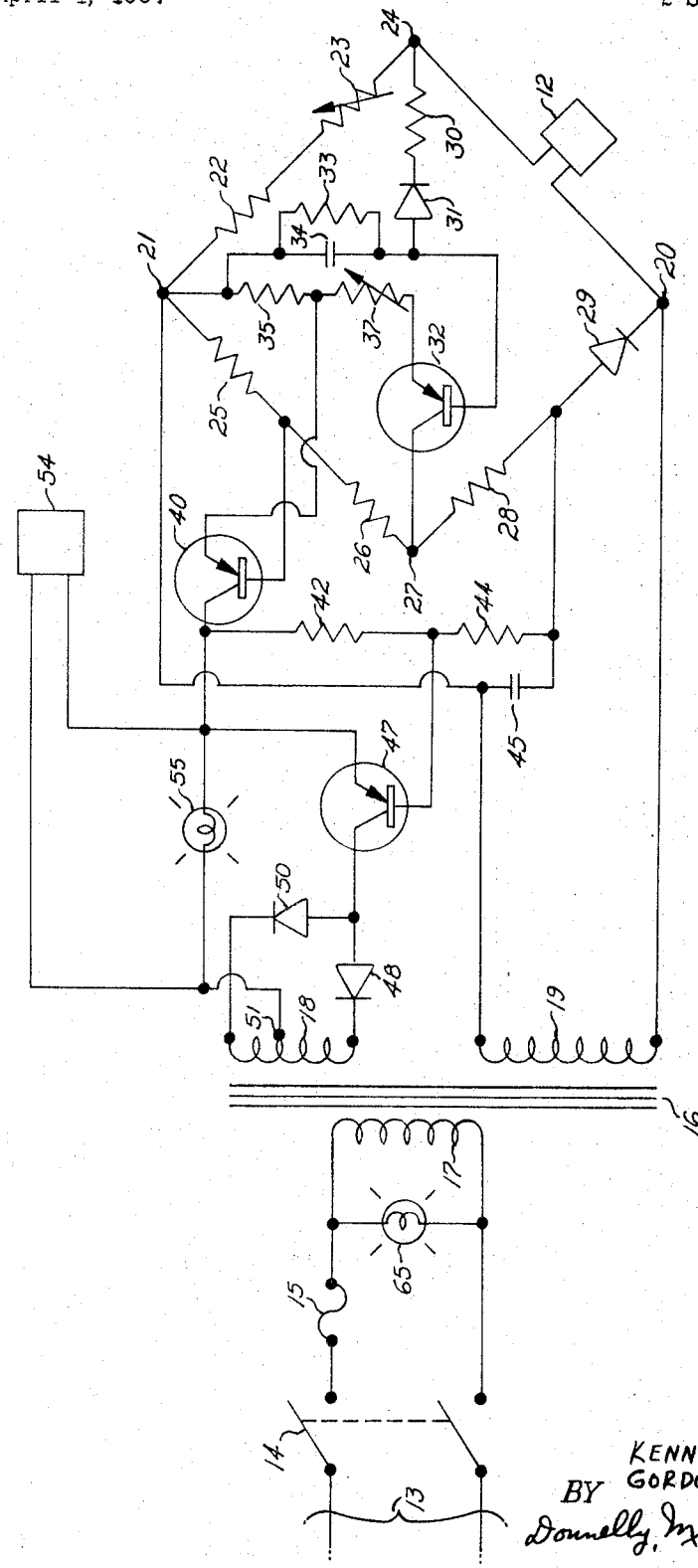

In the drawings:

FIG. 1 shows a combined schematic and pictorial representation of the preferred embodiment of this invention; and, FIG. 2 shows the circuit of FIG. 1 in a Wheatstone bridge type arrangement.

Referring now to the drawings, the system includes a tank 10 which contains a solution 11, the concentration of which is to be controlled. This control is to be achieved through an electronic control system including a Wheatstone bridge type circuit, one leg of which is defined by a condition sensing means in the form of a conductivity sensing cell 12. The power for the system is supplied from an alternating current line 13. Alternating current is supplied from the line 13 through a double pole, single throw switch 14, a fuse 15 and a transformer 16, the primary winding 17 of which is electromagnetically coupled to a secondary winding 18 and a tertiary winding 19. The winding 19 has a pair of output terminals 20, 21, which terminals may be considered the input terminals to a bridge type network. Terminal 21 is connected through a fixed resistor 22 and a variable resistor 23 to a termnial 24, which terminal is connected to one electrode of cell 12. Resistors 22 and 23 define the impedance means of one leg of the bridge type circuit and terminal 24 is one of the diagonal terminals. Terminal 20 of tertiary winding 19 is connected to the other electrode of cell 12 to thus supply alternating current to the cell 12 which defines a second leg of the bridge type circuit. The entire power for the system including power to control the solution concentration and power to energize the solid state devices, which will be subsequently described, is derived from transformer 16. The third leg of the bridge is defined by a pair of resistors 25, 26 serially connected between a diagonal bridge terminal 27 and power input terminal 21. The fourth leg of the bridge includes a resistor 28 and a diode 29 serially connected between diagonal terminal 27 and power input terminal 20. Diode 29 acts as a halfwave rectifier to supply power to two semiconductor devices to be described. The detecting circuit for the Wheatstone bridge network includes a solid-state circuit having input terminals connected to bridge terminals 21, 24 and 27.

The detecting circuit includes a resistor 30, a diode 31 and the base-collector junction of an amplifying transistor 32, all serially connected between diagonal terminals 24, 27. A base bias and filter circuit for transistor 32 includes a resistor 33 and a capacitor 34 connected in parallel between the base of transistor 32 and terminal 21. The emitter circuit for transistor 32 includes serially connected resistors 35, 37 connected between the emitter and terminal 21. The next stage of the detecting circuit includes a first switching transistor 40 having its base electrode connected intermediate resistors 25, 26 and its emitter electrode connected intermediate resistors 35, 37. The collector electrode of transistor 40 is connected through serially connected resistors 42, 44 to a point intermediate resistor 28 and diode 29. A filter capacitor 45 is connected between terminal 21 and the anode of diode 29. A second switching transistor 47 has its emitter connected to the collector of transistor 40 and its base connected intermediate resistors 42, 44.

The emitter-collector circuit of transistor 47 is serially connected in a condition control circuit which includes diodes 48, 50, connected for fullwave rectification to winding 18 of transformer 16, center tap 51 of winding 18, solenoid 54 and indicator lamp 55. The solenoid 54 acts as a condition control means and controls a valve 56, which valve controls the flow of water from an inlet pipe 57 through an outlet 58. This water flows into a tank 60 containing a concentrate 61 which overflows through pipe 62 into tank 10 where the concentrate mixes with the fluid 11 to increase the conductivity between the electrodes of cell 12. The system includes a pilot light 65 which is connected in parallel with the primary winding 17 and thus indicates when power is being applied to the system through switch 14 and fuse 15. The lamp 55 indicates conductivity through the solenoid 54 and thus indicates when concentrate is being added to the solution, i.e., when the condition control means is in operation.

The operation of this system is as follows: Adjustment of the fluid conductivity at which the potential at terminal 24 is the correct value to cause deenergization of solenoid 54 is accomplished by the setting of variable resistor 23. Adjustment of the potential at terminal 24, which causes the controller system to energize solenoid 54, is made by the setting of variable resistor 37 in cooperation with fixed capacitor 35. When the potential across capacitor 34 and resistor 33 is such that it is more negative than the voltage occurring at the emitter of transistor 32, transistor 32 is in a conducting state and its collector is at a lower potential than the source potential. This collector potential of transistor 32 is divided across resistors 25, 26 to maintain the base of switching transistor 40 at a more positive level than the emitter of transistor 40, thus transistor 40 does not conduct. Accordingly, no current flows through resistors 42, 44 and negligible voltage exists from emitter to base of second switching transistor 47, thus transistor 47 is held in a non-conducting state. Therefore, no current flows through fullwave connected diodes 48, 50 and the associated condition controlling circuit which includes solenoid 54 and lamp 55. The solenoid 54 is therefore deenergized. As the conductivity of the fluid being measured in tank 10 by cell 12 and specifically the fluid 11 decreases, the voltage applied to terminal 24 decreases in magnitude with reference to the potential on terminal 21 of tertiary winding 19 and thus the base of transistor 32 becomes more positive than the emitter potential and transistor 32 ceases conduction. When transistor 32 ceases conduction, negligible current flows through resistor 37 due to the collector current of transistor 32 and the source voltage is divided across resistors 25, 26 and 28. This causes the base of transistor 40 to become less positive than its emitter which then allows transistor 40 to become more conductive. Current then flows in resistors 42, 44 due to the collector current of transistor 40. The resulting voltage drop across resistor 42 forward biases the emitter-to-base circuit of transistor 47 which becomes conductive and therefore allows current to flow through the emitter-to-collector circuit through diodes 48, 50, transformer winding 18, solenoid 54 and lamp 55. Lamp 55 indicates that the system is undergoing a control operation. The energization of solenoid 54 opens valve 56 which allows flow of water by way of pipe 58 into the tank 60 which adds additional reagent to the solution being controlled by overflowing a concentrated solution of ions from tank 60 to the tank 10 through pipe 62. This causes the conductivity of the solution 11 and thus the conductivity between the electrodes of cell 12 to increase which thus allows the voltage at terminal 24 to increase. Flow continues until the potential at terminal 24 reaches a preset level indicating the proper solution concentration. When the predetermined potential is reached, transistor 32 again becomes conductive and causes a voltage drop to appear across resistor 28. The voltage drop across resistors 25, 26 decreases in magnitude, i.e., becomes a lower negative potential, and applies this lower negative potential to the base of transistor 40 which causes the emitter-to-base circuit of transistor 40 to become reverse biased thereby interrupting current flow through resistors 42, 44. This interruption of current through resistors 42, 44 causes the potential appearing across the emitter-to-base circuit of transistor 47 to become essentially zero and transistor 47 becomes nonconducting so that no current can flow through diodes 48, 50 and thus cannot flow through the solenoid 54 and solenoid 54 is deenergized. The transformer primary winding 17 is preferably connected to a low frequency source such as 110 volts at 60 cycles per second to provide the operating potentials for the system.

While the system has been described in connection with the control of solution conductivity measuring and control, it is understood that the system can be employed with any system in which a condition responsive variable impedance is employed as a condition sensing means and some form of electrical condition control means may be employed to control the condition which is being sensed by the sensing means.

What is claimed is:

1. In a condition responsive system, the combination comprising:
  (a) a pair of input terminals, means for applying alternating current to said terminals;
  (b) a Wheatstone bridge including;
  (c) a first impedance means connected to one of said terminals and defining one leg of said bridge;
  (d) condition responsive impedance means connected to said first impedance means and defining a second leg of said bridge; said first impedance means and said condition responsive impedance means being serially connected between said pair of terminals;
  (e) a first and a second resistance means defining a third leg of said bridge;
  (f) third resistance means and a unilateral impedance means serially connected between one of said input terminals and said first and second resistance means to define a fourth leg of said bridge;
  (g) semiconductor means having at least a first, a second and a third electrode;
  (h) means coupling said first electrode to a point intermediate said second and said third resistance means;
  (i) rectifier means connecting said second electrode to a point intermediate said first impedance means and said condition responsive means; and,
  (j) output means connecting said third electrode to one of said input terminals, said output means delivering an output in response to changes in condition of said condition responsive impedance means.

2. The combination according to claim 1, further including:
  (a) resistance means coupling one of said input terminals to a point intermediate said second electrode and said rectifier means for developing a bias between said second and said third electrodes.

3. The combination according to claim 1, wherein:
  (a) said output means includes variable resistance means for controlling one of the limits of the condition to which said system is to be responsive.

4. The combination according to claim 3, wherein:
  (a) said first impedance means includes manually variable impedance means for controlling another of the limits of the condition to which said system is to be responsive.

5. In a condition controlling system:
  (a) means for applying alternating current power to said system;
  (b) Wheatstone bridge means including:
  (c) a first impedance means and a condition responsive impedance means serially connected between a pair of input terminals of said Wheatstone bridge;
  (d) a pair of resistance means, a third resistance means and rectifier means serially connected between said pair of input terminals;
  (e) semiconductor means connected to a point intermediate said pair of resistance means and said third resistance means and coupling means connecting said semiconductor means to a point intermediate said first impedance means and said condition responsive impedance means;
  (f) output means connected between said semiconductor means and one of said input terminals;
  (g) switching means connected to said output means; and,
  (h) condition control means connected to said switching means and actuated thereby.

6. The combination according to claim 5, wherein:
  (a) said output means includes variable resistance means; and,
  (b) wherein said system further includes additional resistance means connecting one of said input terminals to said semiconductor means.

7. The combination according to claim 5, wherein:
  (a) said coupling means includes a second rectifier means.

8. The combination according to claim 5, further comprising:
  (a) resistance means connecting one of said input terminals to one of said semiconductor means to develop a bias therefor.

9. The combination according to claim 6, wherein:
  (a) said output means includes second semiconductor means having a first electrode connected intermediate said pair of resistance means, a second electrode connected to said variable resistance means and a third electrode connected to said condition control means.

10. In a condition sensing and controlling system, the combination comprising:
  (a) alternating current input means including a transformer having primary, secondary and tertiary windings;
  (b) condition control means connected to said secondary winding;
  (c) rectifier means and semiconductor switch means connecting said condition control means to said secondary winding;
  (d) condition sensing means having a first and a second terminal, said first terminal being connected to said tertiary winding;
  (e) resistance means coupling said second terminal to said tertiary winding;
  (f) semiconductor detecting means connected between said terminals and said semiconductor switch means;
  (g) said detecting means including a first and a second diode, each connected to one of said terminals;
  (h) a first semiconductor having at least a first, a second and a third electrode;
  (i) means coupling said first electrode to said first diode;
  (j) a first resistor coupling said second diode to said second electrode;
  (k) a first pair of serially connected resistors connecting said second electrode to said tertiary winding;
  (l) a second pair of resistors coupling said third electrode to said tertiary winding; and,
  (m) resistance means coupling said first electrode to said tertiary winding.

11. The combination according to claim 10, wherein:
(a) said detecting means includes a second semiconductor having a first, a second and a third electrode;
(b) said first electrode being connected intermediate said first pair of resistors;
(c) said second electrode being connected intermediate said second pair of resistors; and,
(d) a third pair of resistors connecting said third electrode to said second diode.

12. The combination according to claim 11, wherein:
(a) said semiconductor switch means has a first, a second and a third electrode;
(b) said first electrode being connected to said third electrode of said second semiconductor;
(c) said second electrode being connected intermediate said third pair of resistors; and,
(d) said third electrode being connected to said rectifier means.

13. The combination according to claim 12, wherein:
(a) said resistance means includes a first variable resistor; and,
(b) wherein one of said second pair of resistors is variable, said variable resistor defining means for setting one of the control limits of said system.

References Cited

UNITED STATES PATENTS

| | | | |
|---|---|---|---|
| 2,764,892 | 10/1956 | Rosenthal | 73—344 |
| 2,928,406 | 3/1960 | Cunniff et al. | 137—5 |
| 2,933,094 | 4/1960 | Cunniff et al. | 137—4 |
| 2,940,287 | 6/1960 | Henderson | 68—13 |
| 3,075,128 | 1/1963 | Cutsogeorge et al. | 317—153 X |
| 3,117,311 | 1/1964 | Lemaire | 317—153 X |
| 3,243,685 | 3/1966 | Burley. | |

MILTON O. HIRSHFIELD, *Primary Examiner.*

L. T. HIX, *Examiner.*